Dec. 28, 1965    R. DUSINBERRE ET AL    3,226,021
IMPULSE-OPERATED ODOMETER MECHANISM
Filed June 4, 1964    4 Sheets-Sheet 1

INVENTORS
ROBERT DUSINBERRE
FREDERICK A. GREENAWALT
RUSSELL E. KRAFT
BY Ephraim Banning
ATTORNEY Dec. 28, 1965  R. DUSINBERRE ET AL  3,226,021
IMPULSE-OPERATED ODOMETER MECHANISM
Filed June 4, 1964  4 Sheets-Sheet 2

INVENTORS
ROBERT DUSINBERRE
FREDERICK A. GREENAWALT
RUSSELL E. KRAFT

BY
ATTORNEY

INVENTORS
ROBERT DUSINBERRE
FREDERICK A. GREENAWALT
RUSSELL E. KRAFT

BY
ATTORNEY

United States Patent Office 3,226,021
Patented Dec. 28, 1965

3,226,021
IMPULSE-OPERATED ODOMETER MECHANISM
Robert Dusinberre, 2800 E. Oakland Park Blvd., Fort Lauderdale, Fla., and Russell E. Kraft, Fort Lauderdale, and Frederick A. Greenawalt, Pompano Beach, Fla.; said Kraft and said Greenawalt assignors to said Dusinberre
Filed June 4, 1964, Ser. No. 372,535
11 Claims. (Cl. 235—96)

This invention relates to an impulse-operated odometer mechanism adapted, when set to a chosen starting point, to count up or down, as desired. It may also be adapted to various fields of use for registering units of distance, time, revolutions, etc.

For convenience, and by way of example only, the odometer mechanism, as herein disclosed, is one specially designed for use on motor vehicles equipped with the usual speedometer which adds up the number of miles traveled. Such a speedometer is powerless, however, to register the number of miles still to be traveled before a selected destination is reached. This involves subtraction which is a reverse of the usual operation of addition. The odometer of our invention achieves this special objective.

The usual speedometer is also devoid of any odometer mechanism capable of being set to zero or any other starting point, whereby to indicate the distance thereafter traveled over a preselected route. This is a feature involving some extra expense which is usually avoided in all except the more expensive automobiles. By the mechanism of our invention, this feature is supplied in a separate instrument, to be driven from the already-installed cable drive to the speedometer, with provision for its mounting close to or remote therefrom, according to whatever location is most convenient.

A further feature of our invention is the power take-off mechanism which is adapted to be interposed in the cable drive to the speedometer without relocation of either. This take-off mechanism comprises (1) a gear train through which motion is transmitted at a greatly reduced speed, and (2) an electric circuit having a control switch minus any dwell period so as to produce periodically a closing of the circuit which, under all conditions, is but momentary. This switch is operated from the gear reduction train which is incorporated in the power take-off mechanism so as to constitute one component thereof. The gear reduction train and switch, both accommodated in the same housing, form a major unit of our invention.

A further feature of the present odometer mechanism is the simple and improved means whereby periodic operation thereof, in either direction, as desired, is produced in response to an impulse force transmitted thereto. As a consequence, the changing figures displayed upon its dial may add up or count down, as preferred. This change from addition to subtraction involves only the axial shifting of a control rod having a conveniently located knob to facilitate its manual operation.

The counter mechanism of our improved odometer comprises a plurality of coaxial dial wheels with appropriate digits carried on their peripheries to be read through a window at the front of a separate housing comprised in the instrument. Each dial wheel is independently adjustable by finger contact therewith, the housing being formed with a bottom opening through which the lowermost arcuate portions of the dial wheels are protruded so as to be accessible for manual operation. Provision is thereby made for rotative adjustment of any or all of the dial wheels to desired positions for the start of a new count or for any other purpose. Any special connections to these wheels for rotative setting thereof are entirely dispensed with. All operating parts for the odometer mechanism are accommodated within this second housing to constitute a separate unit of our invention.

These and various other objects and advantages inherent in this invention will be apparent from the following detailed description thereof, taken in conjunction with the accompanying drawings, wherein—

As shown, the gear-switch unit comprises a cylindrical housing A having a threaded nipple 30 depending from its bottom 31 and a closure plate 32 removably fitted to its open top with a collar 33 rising axially therefrom. Interiorly the collar is threaded to engage a nipple 34 depending from a speedometer head 35. Fitted around the nipple 30 which is exteriorly threaded is a coupling nut 36 joined rotatably to one end of a flexible sheathing 37 through which is extended a flexible cable 38 terminating in a shank 39 having a square cross section. A housing of this description is adapted for interposition between (1) the usual cable which is rotated in response to travel of an automobile over a road and (2) a speedometer head equipped with suitable means to register both the speed of the vehicle and the accumulated number of miles traveled.

To complete a driving connection between the cable and speedometer head, a shaft 41 is extended axially through the housing, being enlarged at 42 in its lower end portion where it is formed with an axial socket 43, desirably of square cross section, for reception of the similarly formed cable shank 39 to be driven thereby, the connection therebetween remaining intact so long as the coupling nut 36 remains engaged with the nipple 30. The shaft 41 is rotatably carried within suitable bearings within the housing, its upper end portion terminating in a shank 44 having a square cross section the same as the shank 39 at the end of the cable. The collar 33 surrounds the square end portion of the shaft 41 in spaced relation thereto to accommodate within the annular space therebetween the depending speedometer nipple 34, and when so assembled the shank 44 fits non-rotatably within a socketed element 45 depending from the speedometer head to establish a driving connection therewith. The result is to couple drivingly what amounts to two aligned sections of the speedometer shaft or cable.

The shaft 41 mounts a primary gear 46 secured fast thereto to rest against the top face of the housing bottom 31, thereby to limit axial movement of the shaft relative thereto in one direction. Opposite axial movement of the shaft is limited by engagement of the top face of its enlarged end portion 42 with the proximate end of the nipple 31 wherein the shaft is mounted for rotation within the housing. A train of gears mounted within the housing is also adapted to be driven by the primary gear 46, this train, as shown, comprising a second gear 47 having a coaxial pinion 47a, a third gear 48 in mesh with the pinion 47a and itself provided with a coaxial pinion 48a, and a fourth gear 49 in mesh with the pinion 48a and itself provided with a coaxial pinion 49a meshing with a terminal gear 50. It will be noted that each pinion is much smaller in diameter than is its associated coaxial gear whereby to reduce the extent of rotative movement transmitted to the next gear in the train, the total reduction being possibly as great as 1000:1 or so in the mechanism under description. Each gear is mounted idly on a spindle co-parallel with the shaft 41, the lower ends of the spindles being affixed to the housing bottom 31.

A reduction gear of this description may be readily interposed in the drive to the usual speedometer at the point where one is removably coupled to the other, the components of the coupling being adapted also for cooperation with opposite ends of the shaft 41 which is extended axially through the gear housing A so as to be accessible at opposite ends thereof. Simple tools, and nothing else, need be involved in installing the gear-switch unit operatively in place, as just described.

Figures 1, 2, 4:
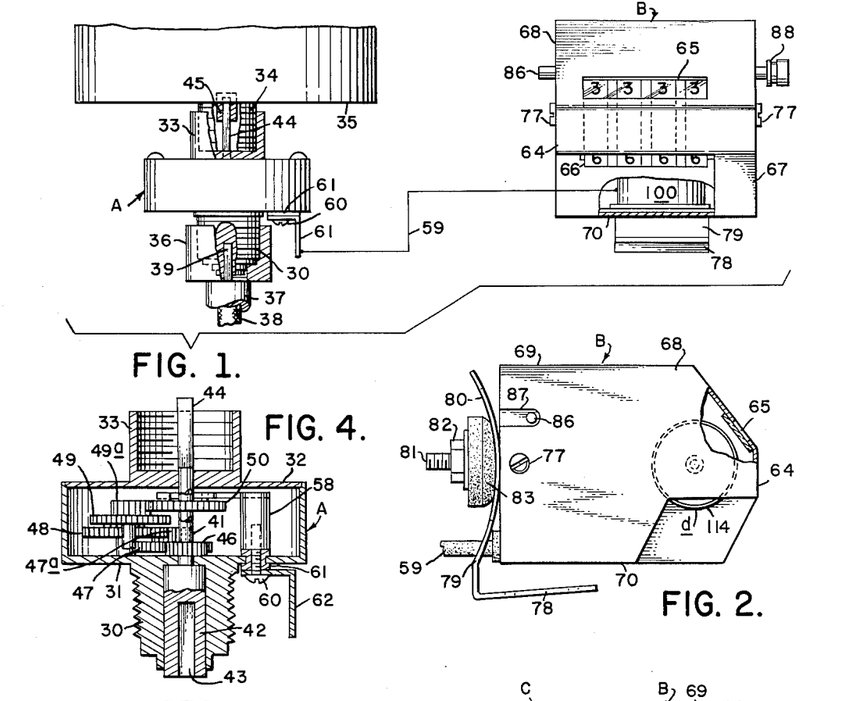
FIGURE 1 is a side elevational view of the gear-switch unit operatively connected to the counter unit which is shown in front elevation.
FIGS. 2 and 3 are end and rear elevations, respectively, of the counter unit.
FIG. 4 is a central vertical section through the gear-switch unit.

The terminal gear 50 which is rotated very slowly forms part of the switch mechanism which operates to close an electrical circuit only momentarily at a predetermined cyclic position of the gear. It also acts to prevent any prolongation of the closed period of the switch and to prevent any closing thereof except at the one predetermined cyclic position provided for the purpose. To achieve these ends, this gear is provided with a post 53 and a pin 54 of insulating material, both upstanding from its top face at points relatively close to its periphery, spaced about 90 degrees apart. The terminal gear then serves as a rotatable mounting for the post and pin, and the housing bottom 31 as a mounting plate for the switch mechanism now to be described. The post is slotted to receive and clampingly engage one end portion of a spring blade 55 whose opposite end portion is biased into engagement with the pin 54. The free end of this blade extends past the pin a short distance to travel through a circular path into which is projected the free end portion of a second spring blade 57 whose opposite end portion is secured fast to an insulated post 58 fixedly upstanding from the housing bottom 31. The moving blade 55 which is carried around through an orbital path by the gear 50 is grounded in the electrical circuit which includes a conductor wire 59 leading from a bolt 60 extending through the housing bottom 31, and insulated therefrom by a washer 61 of fiber or the like, to anchor thereto a terminal 62 and also the insulated post 58 whereon the stationary blade 57 is supported (FIG. 4).

Figures 3, 5, 6, 7, 8, 9:
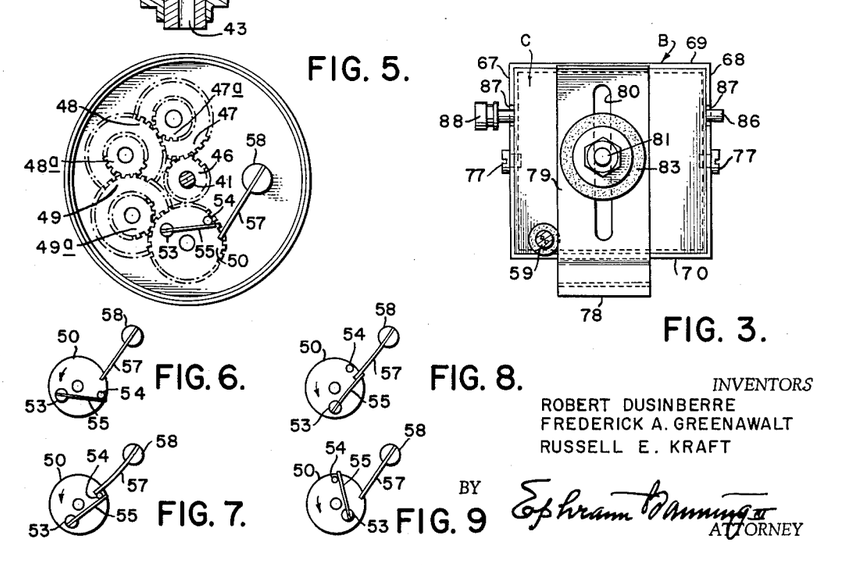
FIG. 5 is a plan view thereof with the cover removed from the housing therefor.
FIGS. 6–9 are fragmentary details in plan, showing operating parts of the switch in four successive positions during each opening and closing cycle thereof.

The relative positions of the two contact blades 55 and 57 at four successive points, during rotation of the terminal gear 50 in the direction indicated by the arrows, is illustrated clearly in FIGS. 6–9. From the first position of FIG. 6 where the traveling blade 55 is normally rested against the insulated pin 54, this pin is advanced toward the blade 57 in response to continued rotation of the gear 50. An initial engagement of this pin by the stationary blade 57 (FIG. 7) is then followed by a progressive deflection of the latter which continues until it clears the pin 54 to snap therebeyond and slidingly engage the free end portion of the traveling blade 55 which itself is deflected in consequence (FIG. 8). This interengagement of the two contact blades is but momentary since both are then constantly moving to limit the wiping contact therebetween to a very brief moment of time which ends when the traveling blade flips off the other and returns to its normal position of rest against the non-conductor pin 54 (FIG. 9).

Just prior to the moment of contact, the non-conductor pin 54 separates the two blades only slightly. This pin then stands approximately in line with the two blade-supporting posts 53 and 58. The tension of the traveling blade 55 is then at its minimum whereas that of the other blade is close to its maximum. Contact follows immediately upon withdrawal of the pin from between the nearly-aligned blades in response to continued slow rotation of the terminal gear 50. This contact involves a swiftly-moving impact force delivered against the free end portion of the traveling blade while at minimum tension. There is opportunity for only a brief wiping contact of one with the other. Once impact has been delivered, there is no dwell period—this wiping contact then proceeds on to conclusion, even though movement of the traveling blade through its orbital path should stop. This is important because it precludes any possibility of a continued closed circuit through the switch in the event of rotation of the terminal gear being halted.

Figure 13:
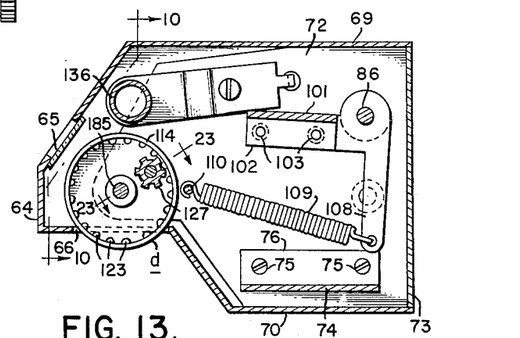
FIG. 13 is a vertical section through the counter unit, taken on line 13—13 of FIG. 12.

A gear-switch unit such as herein described is especially adapted for effective cooperation with a counter unit forming part of the present odometer system. This unit is enclosed within a housing B whose front wall 64 in its upper portion is offset outwardly where it is provided with a window 65 (FIG. 1). Below the window on the under side of the forwardly extended front wall is an opening 66 (FIG. 13) of the requisite size to receive therethrough a lowermost arcuate portion of a set of dial wheels *a*, *b*, *c* and *d*, thereby to be accessible for manual operation. Both the window and opening therebelow are extended crosswise of the housing for the major distance between its two end walls 67 and 68. Joined to these end walls to be supported thereby is a top wall 69 and a bottom wall 70, leaving the housing entirely open at the back. Fitted closely into such a housing is a frame C having side walls 71 and 72 which are united to a vertical back wall 73 which serves as a closure for the rear side of the housing when the frame is fitted thereinto with its side walls lapping the end walls of the housing. Extending between opposite sides of the frame is an elongated ledge 74 which is secured in place as by screws 75 which pass through end flanges 76 thereof to enter holes in the frame side walls 71 and 72. To secure the frame fixedly within the housing, we employ screws 77 (FIGS. 2 and 3) which are rotatively advanced into suitable registering holes in the walls 67–68 and 71–72.

One form of support suitable for adjustable mounting of the counter unit upon a horizontal surface is suggested in FIG. 2 where we have shown an angle bracket having a horizontal leg 78 with holes therethrough for attaching screws or the like, and a bowed vertical leg 79 formed with an elongated vertical slot 80 through which a screw belt 81 is extended for anchorage in the rear wall 73 of the frame. A nut 82 applied to this bolt is adapted for rotative advance against a resilient washer 83 also carried on the bolt, the washer having a bracket-engaging convex face for extended-area contact therewith. All counter mechanism, also an impulse-operating means therefor, is contained within the housing-frame assembly where it is fully protected.

Figure 15:
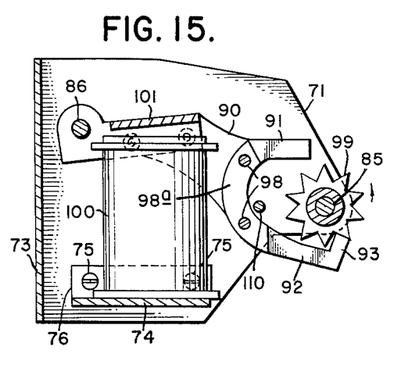
FIG. 15 is an enlarged detail in section, taken on line 15—15 of FIG. 11, showing one pair of the duplex pawl companion fingers in a normal position of rest against the star wheel, preliminary to rotation thereof in one direction.
Figure 16:
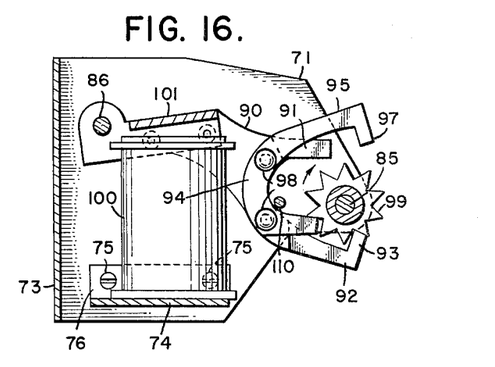
FIG. 16 is a similar view, taken on line 16—16 of FIG. 12, showing a second pair of companion fingers comprised in the duplex pawl in a normal rest position against the star wheel, preliminary to operation thereof in a reverse direction.

The frame side walls provide bearings for opposite end portions of a rotatable counter shaft 85, also for an axially shiftable, two-position rod 86 whose opposite end portions are extended through slots 87 (FIG. 2) in the housing end walls to carry, on one end at least, a terminal knob 88 to facilitate manual operation thereof. A spacer 89 in the form of a washer is fitted onto the rod between the proximate frame wall 71 and an arm 90 fixedly mounted on the rod to extend generally forwardly therefrom. The free end of this arm is yoked to provide an upper finger 91 oppositely of a lower finger 92 which terminates in an upwardly pointing angular tip 93 (FIG. 15). Carried immovably upon one side of this arm is a second arm 94 similarly formed with upper and lower fingers 95 and 96, respectively, but differing therefrom in that it is the upper finger which terminates in an angular tip 97 pointing downwardly (FIG. 16). In each case, the finger whereon the tip is formed extends forwardly a further distance than does its companion finger oppositely thereof. The two fingers 91–92 are also disposed in one vertical plane which is spaced horizontally from a second vertical plane containing the other set of fingers 95–96. The arm 90 with its two sets of companion fingers arranged side by side in spaced parallel relation constitutes, in effect, a duplex pawl and will at times be so referred to herein. In response to operating means presently to be described, this duplex pawl is adapted to be rocked whenever the rod 86 is similarly oscillated, and in any such movement the two sets of fingers move therewith in separated planes. The two arms 90 and 94, with an arcuate spacer 98a therebetween (FIG. 15), are fixedly secured together as by means of interconnecting rivets 98.

Mounted idly on the counter shaft 85 is a star wheel 99, here illustrated as having ten pointed teeth with V-notches therebetween. Its diameter is such as to fit between either set of companion fingers 91–92 or 95–96 but not both at the same time; its positioning with reference to the rod 86 is such that the longer finger of each set extends beyond a nearly vertical center line $x$—$x$ perpendicular to a line $y$—$y$ extending between the axes of the shaft 85 and the rod 86, whereas its shorter finger terminates short thereof; and its width is such as to lie between only one set of these companion fingers at a time. Since both sets of fingers are part of the duplex pawl which is mounted fast on the axially shiftable rod 86, any endwise adjustment thereof, either way, will determine which set of companion fingers shall occupy a position oppositely of the star wheel. This makes it possible for either set of companion fingers to engage with the star wheel to produce a limited rotative advance thereof and in the direction desired—an important feature of our invention for reasons which will hereafter appear.

Figure 11:
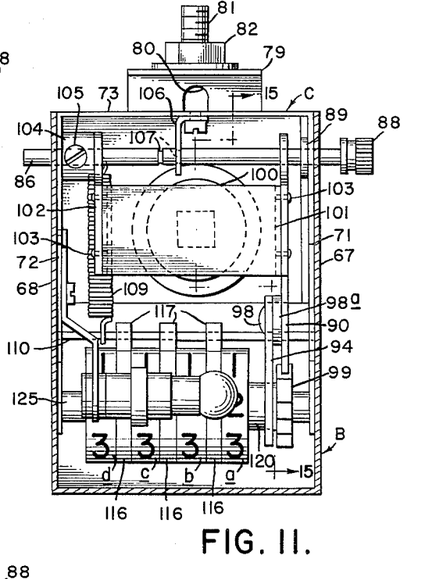
FIG. 11 is a horizontal section through the counter unit, taken on line 11—11 of FIG. 10, the duplex pawl being shown as shifted to operate the dials wheels in a chosen direction.
Figure 12:
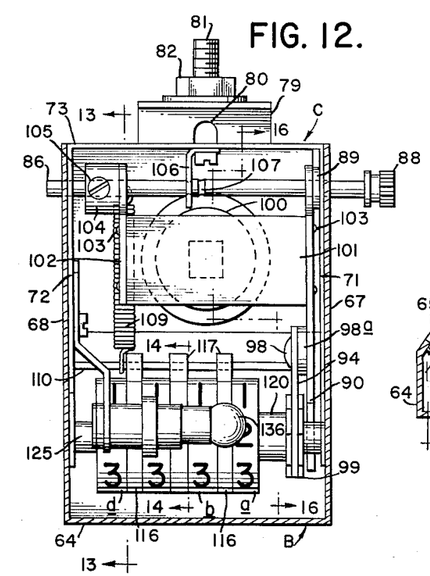
FIG. 12 which is a similar view shows the duplex pawl as shifted oppositely to cause operation of the dial wheels in the reverse direction.

Rested fixedly on the ledge 74 is an electro-magnetic means here indicated as a solenoid 100 with one end of which the conductor wire 59 is in circuit. One pole of this solenoid faces oppositely of an armature bar 101 extending between the arm 90 and the horizontal arm 102 of a bell crank (FIGS. 11 and 13) carried fast on the rod 86 near its opposite end. Rivets 103 are extended through flanges at opposite ends of the armature bar and through the two arms 90 and 102 to assure a rigid connection therebetween. The bell crank is provided with a laterally extending hub 104 through which a set screw 105 may be radially advanced against the rod to lock the crank thereto. When so assembled therewith, the rod is free to be axially shifted in its bearings for a limited distance. Engagement of the hub 104 with the proximate frame side wall limits movement of the rod in one endwise direction, and engagement of the arm 90 with the spacer 89 separating it from the other side wall of the frame limits the rod movement in the opposite direction. A spring wire detent 106 supported from the frame rear wall 73 overlies the rod to engage therewith. Two circumferential grooves 107 are also formed in the rod, spaced apart no greater than is its capacity for endwise shifting movement. These grooves are positioned adjacent the spring wire detent so as to be alternately engaged thereby when the rod is shifted to either of its two positions. By this means the rod is normally held indefinitely in place when adjusted axially to the position desired.

Figure 17:
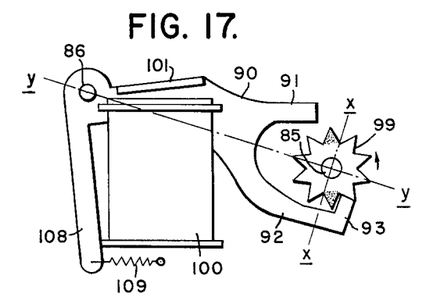
FIG. 17 is a diagrammatic view of the solenoid and one pair of companion fingers comprised in the duplex pawl, together with the biasing spring therefor, the parts being shown in their normal position of rest, the same as in FIG. 15, preliminary to rotation of the star wheel in one direction.
Figure 18:
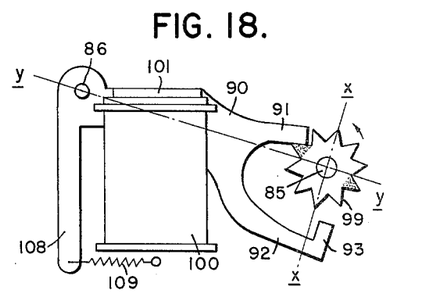
FIG. 18 which is a similar diagrammatic view shows the solenoid at the moment of its energization when the duplex pawl has been operated from its position of rest to a second position in which an initial rotative movement has been imparted to the star wheel, as in FIG. 16.
Figure 19:
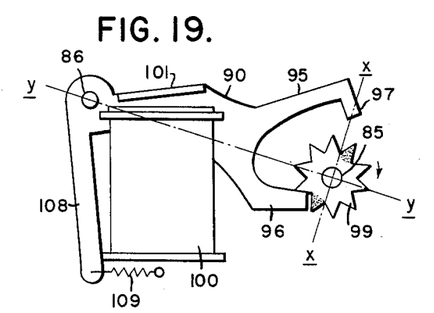
FIGS. 19 and 20 are similar diagrammatic views showing the second pair of duplex pawl companion fingers, corresponding to those in FIG. 16, in positions of rest and advance, respectively.
Figure 20:
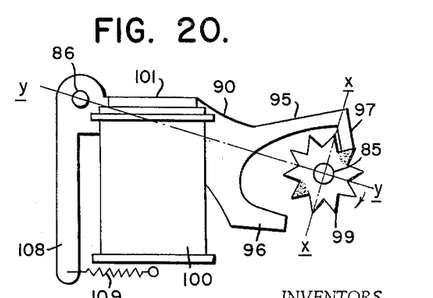

A depending arm 108 of the bell crank is connected near its free end to one end of a coiled tension spring 109 whose opposite end is hooked over a rod 110 extending between the frame side walls 71 and 72. The constantly exerted pull of this spring, operating through the bell crank, tends to hold the armature bar 101 in an upper position, slightly away from the proximate pole of the solenoid (FIGS. 15 and 16). When energized, however, the solenoid exerts a strong pull which is sufficient to overcome the opposite pull of the spring 109. Each movement of this bar, either way, is accompanied by a rocking stroke of the duplex pawl and arm 108. The arm 90 or 94 whose fingers are then positioned oppositely of the star wheel is alone effective to advance its fingers into engagement therewith to impart a limited rotation thereto in the manner following:

With the rod 86 set for operation of the star wheel to the left, the fingers oppositely thereof will be positioned about as represented diagrammatically in FIG. 17. Here the tension of the spring 109 is effective to bias the arm 90 upwardly to the point that the tip 93 on its lower finger is engaged with the star wheel 99 within one of its V-notches between two adjacent teeth. The teeth so engaged are stippled in FIGS. 17–20 so that they may be readily identified therein in each of the various moved positions of the star wheel during a two-stroke operation of the duplex pawl. So long as the rocking arm 90 continues in this position, its tip 93 acts as a detent to oppose rotation of the star wheel from each of its ten predetermined rotative positions which are spaced 36 degrees apart. But with a momentary energization of the solenoid 100, the arm is rocked through a down stroke to (1) disengage the tip 93 from the star wheel which is then free for rotation, and (2) concurrently advance the shorter finger 91 toward the wheel from above to engage therewith between two adjacent teeth which are disposed to the left of the center line x—x. The force exerted on the down stroke by this finger initiates rotation of the wheel. Since it then stands in the path of the next oncoming tooth, the wheel movement is halted after a rotative advance equal to about half the distance between two adjacent notches. At this point the solenoid is deenergized, permitting the spring 109 to exert its force which then rocks the arm 90 upwardly through a reverse stroke. In so doing, the tip 93 reengages the star wheel from below and to the right of the center line x—x, thereby continuing the rotative advance of the star wheel. The tip then comes to rest within the notch next adjacent the one just previously occupied where it remains inactive, except as a detent, until the next periodic energization of the solenoid.

This two-stroke operation is characterized by successive impact forces applied to the periphery of the star wheel, one from above and to the left of its vertical center line and the other from below and to the right of its center line, resulting in a total rotative advance equal to the distance between two adjacent teeth. Exactly the same operation takes place when the star wheel is to be rotated in the opposite direction, the rod 86 being first adjusted properly for this purpose. This is illustrated diagrammatically in FIG. 19 which shows the arm 94, together with its fingers 95–96, in their normal positions of rest; and in FIG. 20 where the same arm has been rocked downwardly in response to energization of the solenoid. Here it will be noted the forces which rotate the wheel reversely proceed first downwardly from above and to the right of its center line and then from below and to the left thereof, being a two-stroke operation the same as already described.

Figure 10:
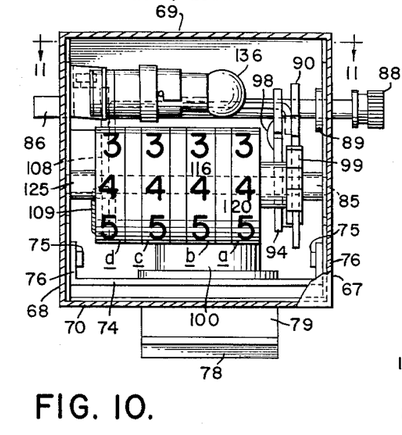
FIG. 10 is a vertical section through the counter unit, taken on line 10—10 of FIG. 13.
Figure 14:
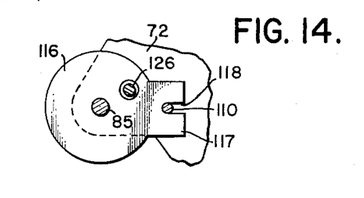
FIG. 14 is a fragmentary sectional detail, taken on line 14—14 of FIG. 12, showing one of the disc spacers comprised in the dial wheel assembly.
Figure 23:
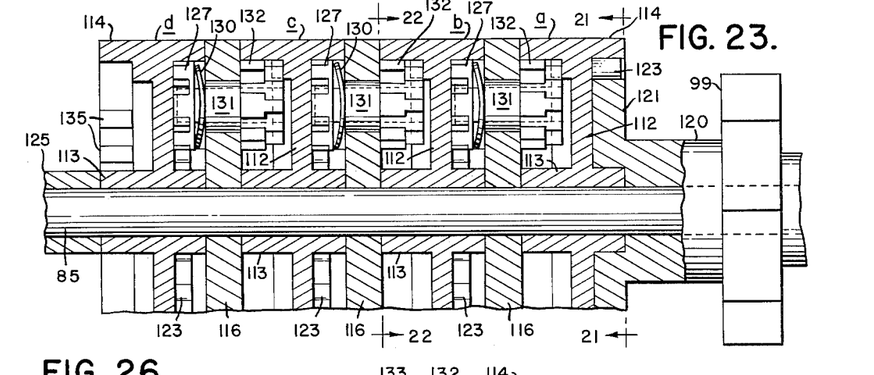
FIG. 23 is an axial section through the dial wheel assembly taken on line 23—23 of FIG. 13, showing the pinion drives between the several wheels thereof.

Mounted idly on the counter shaft 85 is the assembly of duplicate dial wheels a–d, each comprising a circular web 112 extending radially outwardly from a hub 113 to support a peripheral band 114. As shown in FIGS. 10 and 23, there are four such wheels, this number being ample for most purposes. Each dial wheel is separated from the one adjacent by a stationary spacer disc 116 having a circular portion extending through 270 degrees or so of the same diameter as the number wheels and an ear 117 projecting radially therefrom. Formed in this ear is a slot 118 open at its outer end to receive the rod 110 which extends cross wise of the frame just rearwardly of the wheels (FIGS. 11 and 14), to hold the spacer against rotation.

Upon each dial wheel band 114 is carried a set of numerals from 0 to 9 inclusive, spaced apart 36 degrees, the positions of these several wheels being directly to the rear of the front window 65. The ten rotative positions of rest of the star wheel 99, controlled by the detent functioning of the spring biased arms 90 and 94 engaging therewith, are transmitted to the several dial wheels on the counter shaft 85 by means shortly to be described. The location of the numerals rotatively upon the dial wheel bands is such that, when each wheel is in one of its predetermined rest positions, one numeral only will be displayed directly oppositely of the window, thus enabling one to read the entire combination of figures exhibited on all dial wheels to obtain a mileage determination therefrom.

Figure 21:
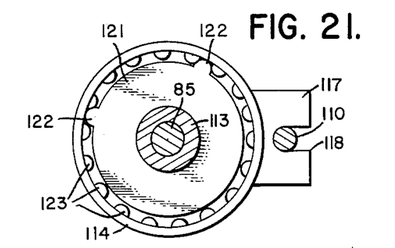
FIG. 21 which is a section on line 21—21 of FIG. 23, shows in elevation one face of the primary dial wheel together with the driving means therefor.

Extending laterally from the star wheel is an elongated hub 120 terminating in a circular head 121 (FIG. 21) having one or more peripheral teeth 122 adapted to mesh and lock with any selected teeth 123 extending continuously around the inner face of the band 114 within the adjacent circular chamber of the primary dial wheel a (FIGS. 21 and 23). This chamber is duplicated on the opposite side of the wheel web 112, these opposite chambers being provided by a substantial in-setting of the web from both ends of the associated hub 113 and band 114. Similar chambers are formed in the remaining dial wheels b, c and d. A circular ring gear 124 is formed on one face of the web, extending adjacent the band 114, the crowns of all of the teeth in this gear being disposed coplanarly. A spacer collar 125 is fitted on to the shaft 85 between the frame wall 68 and the proximate wheel d to cooperate with the head 121 in fixing correctly the axial position of the dial wheel assembly thereon.

Figure 25:
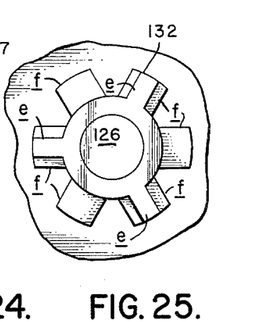
FIG. 25 is an end elevation of the pinion drive assembly, looking toward the right as viewed in FIG. 27.
Figure 26:
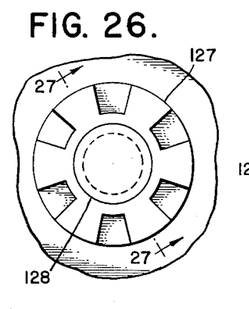
FIG. 26 is a similar view of the opposite end of the pinion drive assembly, looking toward the left as viewed in FIG. 27.
Figure 27:
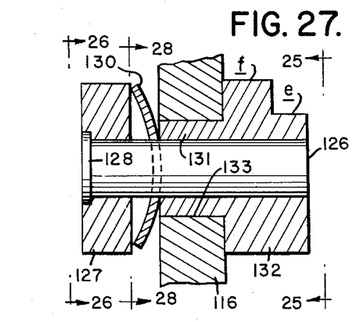
FIG. 27 is a fragmentary sectional view of the friction clutch, taken on line 27—27 of FIG. 26.
Figure 28:
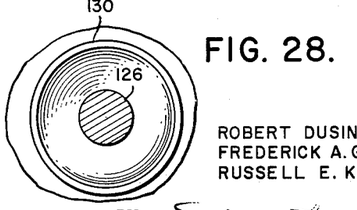
FIG. 28 is a detail in section, taken on line 28—28 of FIG. 27, showing in elevation the friction clutch comprised in the dial wheel drive.

Each spacer disc mounts a pinion drive assembly which comprises a drive shaft 126 mounting a freely rotatable pinion 127 adjacent a stop flange 128 at one end of the shaft (FIG. 27). Also freely mounted on this shaft is a dished spring washer 130 whose concave face confronts the pinion 127 to engage peripherally therewith. This washer is maintained under tension by an end thrust from a collar 131 which is extended axially from a duplex pinion 132 mounted fast on the shaft 126, as by a press fit, in the endwise position which is requisite for this purpose. The outer portion of the duplex pinion 132 is provided with three coplanar teeth e spaced apart 120 degrees (FIG. 25). Elsewhere this pinion is formed with six peripheral teeth f spaced uniformly apart, all as illustrated in FIGS. 25 and 26. An opening 133 through the spacer disc provides a bearing in which the collar 131 is rotatably supported so that, with the pinion 127 and washer mounted rotatably on the shaft to lie in the chamber on one side of the wheel web 112, and the duplex pinion fitted fast upon the shaft to remain in the opposite wheel chamber, assembly of the pinion drive in its operative position may be easily performed.

In response to a driving force applied to the duplex pinion 132, it is obvious the shaft 126 will likewise be rotated, but that the only force acting upon the pinion 127 to produce rotation thereof is transmitted through the spring washer 130 whose convex face is subjected to a reactive thrust force from the collar 131 and whose concave face, adjacent its periphery, exerts a thrust force against the pinion 127. These two points of frictional engagement with opposite faces of the spring washer transmit the only force to the pinion 127 tending to produce rotation thereof. Since only a uniformly low frictional resistance needs to be overcome in order that the driven pinion 127 may be rotated, the friction drive just described is adequate to assure dependability in operation. It is also one which readily yields to rotative readjustment of any or all of the dial wheels in response to a manual force applied peripherally thereto, as will be more fully touched upon hereinafter.

Figure 22:
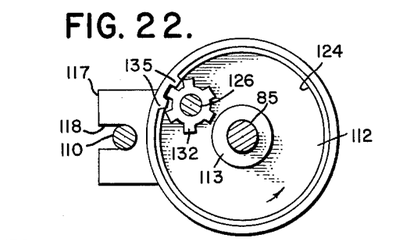
FIG. 22 is a similar view, taken on line 22—22 of FIG. 23.
Figure 24:
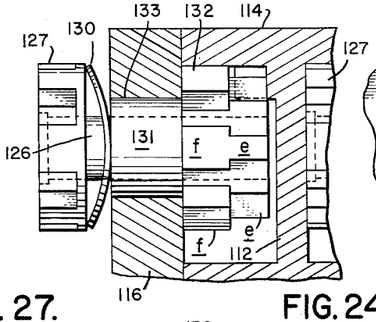
FIG. 24 is an enlarged detail in section of one pinion drive assembly, several of which, on a smaller scale, appear in FIG. 23, one between each pair of adjacent dial wheels.

The driven pawl 127 is adapted to mesh with the teeth 123 extending around the inner face of the band 114 where it provides an internal ring gear. Oppositely of the six teeth f carried by the inner portion of the duplex pinion is a pair of teeth 135 extending radially inwardly of the band 114 (FIG. 22). These two teeth are spaced apart the same as the pinion teeth f so as to mesh therewith. In this position the three end teeth e are also engaged with the coplanar teeth of the ring gear 124 (FIG. 24). A system of driving connections, involving four dial wheels, more or less, with driving pinion assemblies therebetween as just described, will then operate as follows:

Rotative advance of the star wheel 99 through 36 degrees will transmit a like movement to the primary dial wheel a. Once during each rotation of this wheel the pinion drive assembly will be operated. This takes place when the two teeth 135 of the ring gear engage the six teeth f of the driving pinion 132. A partial rotation of drive shaft 126, limited to 120 degrees, then follows. The driven pinion 127, because of its engagement with the teeth 123 of the gear upon the inner face of the wheel band 114, thereupon transmits a 36 degree movement to the dial wheel b adjacent thereto. Following this limited advance, the three teeth e remain continuously engaged with the coplanar ring gear 124, thereby holding the pinion drive stationary until the teeth 135 have completed a movement through nearly 360 degrees to a position for cyclic re-engagement with the pinion teeth *f*.

The dial wheel *b* which is advanced only one-tenth the distance of the primary wheel operates, in time, to advance the adjacent dial wheel *c*, but only one-tenth the distance of its own rotation, the pinion drive assembly therebetween operating the same as already described. And the terminal dial wheel *d*, being connected to the wheel *c* by a similar pinion drive assembly, is eventually rotated thereby, but for a distance of only one-tenth as far. In this operation the dial wheels are geared together according to the decimal system, as would be desired for vehicular mileage computations, but optionally the ratios therebetween may and should be appropriately changed for chronological or other computations, as needed.

The odometer mechanism of our invention, when operated in conjunction with a vehicle speedometer, is distinctly advantageous because of its feature of reversibility. If, at the start of a trip reputed to be 255 miles (or any other distance), the driver shifts the rod 86 to a position for decumulation and manually adjusts the dial wheels correspondingly, the instrument will exhibit through its window steadily diminishing readings as to the number of miles still to be traveled before the destination is reached. To some extent these readings may possibly correspond to those displayed on mileage posts along the highway, but only if these are based upon the same route over which the vehicle is traveling. Since that is unlikely in most cases, the steadily decreasing mileage readings afforded by the present instrument will satisfy a need of automobile travelers by informing them accurately at all times of the distance still to be covered before arrival at the desired destination. This feature of operational reversibility may be readily availed of by reason of (1) convenience in manual shifting of the control rod 86 for this purpose, (2) the friction drive between the several dial wheels which permit rotative adjustments of each independently to present a desired reading of mileage figures, and (3) protrusion of a portion of each dial wheel exteriorly of the housing therefor so as to be readily accessible for manual operation independently and in either direction. Night reading of the dial wheels may be assured by providing a bracket-supported electric lamp 136 within the housing B in connection with a current source, and so positioned as to illuminate the dials while remaining shaded from the driver's eyes.

We claim:

1. For application to a rotatable speedometer cable having two aligned sections, a coupling assembly drivingly interconnecting the cable sections, the coupling assembly comprising, in a single unit, a stationary housing concentric with the cable sections, and a two-position dwell-free switch unit mounted within the housing and in connection with one of the cable sections to be periodically operated thereby to a momentarily closed position, the switch unit comprising a train of gears adapted to transmit motion from one of the cable sections to the terminal gear in the train, two spring blades, each supported at one end, the first on a fixed mounting within the housing and the second on the terminal gear to be carried thereby through an orbital path into which the free end of the first blade is projected slightly whereby, with each rotation of the terminal gear, to produce a brief sliding engagement of one blade with the other to momentarily close the switch, the switch unit being interposed in an electrical circuit contained in a second unit including a counter mechanism having an electro-magnetic-driven dial wheel assembly acting, with each periodic operation of the switch to its closed position, to complete the circuit whereby to produce a concurrent operation of the electro-magnetic-driven dial wheel assembly.

2. For application to a rotatable speedometer having two aligned sections, a coupling assembly drivingly interconnecting the cable sections, the coupling assembly comprising, in a single unit, a stationary housing concentric with the cable sections, and a two-position dwell-free switch unit mounted within the housing and in connection with one of the cable sections to be periodically operated thereby to a momentarily closed position, the switch unit comprising a train of gears adapted to transmit motion from one cable section to the terminal gear in the train, two spring blades, each supported at one end, the first blade upon a fixed stationary mounting and the second on the terminal gear to be carried thereby through an orbital path, an insulated element also carried on the terminal gear with opposite faces of which the free end portions of the two blades engage to project slightly therebeyond at one point in the rotative cycle of the gear, the first spring blade being deflected, in response to continued rotative advance of the gear, to the point of yielding sufficiently for the insulated element to pass thereby, the tip end portion of the first spring blade being thereupon freed for wiping engagement with the tip end portion of the second blade to momentarily close the switch, the switch unit being interposed in an electrical circuit contained in a second unit including a counter mechanism having an electro-magnetic-driven dial wheel assembly acting, with each periodic operation of the switch to its closed position, to complete the circuit whereby to produce a concurrent operation of the electro-magnetic-driven dial wheel assembly.

3. An impulse-operated odometer to register cumulatively the repetitive movements of a shaft having two aligned sections comprising, as a first unit, a coupling assembly drivingly interconnecting the shaft sections and provided with a stationary mounting plate arranged transversely thereof, a two-position dwell-free switch carried on the mounting plate and in driven connection with one of the shaft sections to be periodically operated thereby to a momentarily closed position at spaced intervals in direct ratio to the frequency of the shaft repetitive movements, and a second unit comprising an assembly of coaxially mounted dial wheels interconnected for intermittent rotation through progressively varying distances in accordance with a chosen value system, a solenoid adapted for circuitry with a current source and with the switch to be energized momentarily when the switch is operated to closed position, and impulse-transmitting means extending between the solenoid and the dial wheel assembly acting with each energization of the solenoid to intermittently rotate the dial wheels whereby to register cumulatively the shaft repetitive movements during a concurrent period, the impulse-transmitting means comprising a star wheel drivingly connected with the primary wheel in the dial assembly, a duplex pawl rockable through a single arcuate path and provided with two laterally-spaced sets of star wheel-engaging teeth, and a mounting whereon the duplex pawl is shiftable to either a first or second position for rocking movements through parallel arcuate paths, one set of fingers of the duplex pawl being engageable with the star wheel to impart a limited one-way rotation thereto when the duplex pawl is shifted to its first position, and the other set of fingers being engageable with the star wheel to impart a limited rotation thereto but in the opposite direction when the duplex pawl is shifted to its second position, the same solenoid acting to rotate the star wheel in either direction through operation of the duplex pawl when shifted to one or the other of its two positions.

4. A dwell-free switch adapted for circuitry with a current source and an electro-magnetically-operated counter mechanism for registering cumulatively the repetitive movements of a shaft with which the switch is drivingly connected to be thereby periodically operated in timed relation thereto between open and closed positions, the switch comprising two spring blades, means fixedly supporting each blade in a position for momentary contact with the other in response to a relative movement therebetween, the supporting means for each blade engaging therewith at a point remote from a yieldable contacting end portion thereof, the supporting means for the first blade being stationary, and a rotatable mounting for the supporting means for the second blade, the driving connection from the shaft being operative to turn the rotatable mounting to advance the blade supporting means thereon through an orbital path into which a portion of the first blade is slightly projected whereby, with each cyclic movement of the rotatable mounting, the second blade carried thereby is moved from a first to a second position to produce a dwell-free sliding engagement between the free end portions of the two blades, continuing only momentarily, to establish an electrical circuit through the switch to the electro-magnetically-operated counter mechanism, the sliding engagement between the two blades being confined to their yieldable contacting end portions whereby to involve a tensioned pressure engagement therebetween.

5. A dwell-free switch adapted for circuitry with a current source and an electro-magnetically-operated counter mechanism for registering cumulatively the repetitive movements of a shaft with which the switch is drivingly connected to the thereby periodically operated in timed relation thereto between open and closed positions, the switch comprising two spring blades, means fixedly supporting each blade in a position for momentary contact with the other in response to a relative movement therebetween, the supporting means for the first blade being stationary, and a rotatable mounting for the supporting means for the second blade, the driving connection from the shaft being operative to turn the rotatable mounting to advance the blade supporting means thereon through an orbital path into which a portion of the first blade is slightly projected whereby, with each cyclic movement of the rotatable mounting, the second blade carried thereby is moved from a first to a second position to produce a dwell-free sliding engagement between the free end portions of the two blades, continuing only momentarily, to establish an electrical circuit through the switch to the electro-magnetically-operated counter mechanism, the supporting means for each blade engaging therewith at a point remote from a yieldable contacting end portion thereof, and a non-conductor means, carried by the rotatable mounting, positioned near the free end of the second blade adjacent one face thereof, adapted to engage therewith to maintain the same in a state of tension, the non-conductor means being advanced, with turning of the rotatable mounting, to move through an orbital path into a position between the free end portions of both blades where it slidingly engages also with a face of the first blade near its free end portion to deflect the same into a state of progressively increasing tension with continued sliding engagement thereon until, with the non-conductor means positioned at the free end of the first blade, the tension of the first blade is at its maximum, the non-conductor means almost immediately thereafter advancing beyond the first blade to release it for a snap-back into momentary sliding engagement with the proximate face of the second blade preliminary to disengagement therefrom.

6. In a counter mechanism wherein dial wheels and a peripherally toothed star wheel, interconnected for rotative advance of the dial wheels through progressively varying distances, are carried upon a common shaft, means for imparting intermittent rotative movements to the star wheel whereby to transmit motion to the dial wheels comprising a duplex pawl having spaced side-by-side fingers movable toward and from the star wheel axis through different paths on opposite sides thereof, means for shifting the relative positions of the duplex pawl and star wheel whereby either pawl finger may be aligned with the star wheel while the other finger remains misaligned therewith, and means for moving the duplex pawl toward and from the star wheel to produce engagement therewith by the finger aligned therewith whereby to rotatively advance the star wheel in one direction, and to rotatively advance the star wheel in the opposite direction only when the relative positions of the duplex pawl and star wheel have been reversely shifted to align the previously misaligned pawl finger with the star wheel.

7. Means for rotatively advancing the star wheel according to claim 6 wherein the duplex pawl is mounted for alternate reverse movements in a fixed path in which either of its fingers is advanced toward and from the star wheel, and wherein the means for moving the duplex pawl comprises a spring connected therewith to exert a constant force biasing the pawl to move in one direction, and a mechanism for creating and transmitting to the pawl an opposite force of greater magnitude for moving the pawl in the opposite direction counter to the weaker force of the spring.

8. Means for rotatively advancing the star wheel according to claim 6 wherein the duplex pawl is mounted to rock about an axis parallel with that of the star wheel, and wherein the means for moving the pawl comprises a spring connected therewith to exert a constant force biasing the pawl to rock in one direction, and a mechanism for creating and transmitting to the pawl an opposite impulse force for rocking the pawl in the opposite direction.

9. In a counter mechanism wherein dial wheels and a peripherally toothed star wheel, interconnected for rotative advance of the dial wheels through progressively varying distances, are carried upon a common shaft, impulse-operated means for imparting rotative movements to the star wheel for operation of the dial wheels, comprising an arm rockable about an axis parallel with that of the shaft but eccentrically thereof, a free end of the arm being yoked to provide (1) a first set of two spaced fingers of unequal length adapted to receive the star wheel therebetween when aligned therewith, the longer finger above the star wheel extending beyond the center line thereof and the shorter finger below the star wheel terminating short of its center line, the first set of fingers, when positioned in line with the star wheel and rocked by the supporting arm, acting to move alternately into engagement with peripheral teeth of the star wheel on opposite sides of its center line to impart thereto an intermittent rotation in one direction, and spaced laterally from the first set of fingers (2) a second set of two spaced fingers of unequal length also adapted to receive the star wheel therebetween when aligned therewith, the longer finger below the star wheel extending beyond its center line and the shorter finger above the star wheel terminating short of its center line, the second set of fingers, when positioned in line with the star wheel and rocked by the supporting arm, acting to move alternately into engagement with peripheral teeth of the star wheel on opposite sides of its center line to impart thereto an intermittent rotation in the opposite direction, means for shifting the relative positions of the arm and star wheel axially with respect to each other to produce alignment between either set of fingers and the star wheel whereby to cause rotation thereof in either direction, as desired, when alternately engaged thereby in response to rocking movements of the arm, and means for periodically delivering an impulse force to the arm to produce rocking movements thereof.

10. Impulse-operated means for imparting rotative movements to the star wheel according to claim 9 wherein the arm is carried fast upon an oscillatable rod to be rocked therewith, and wherein the rod is mounted for axial shifting between two positions in one of which the first set of fingers is aligned with the star wheel for alternate engagement therewith, the second set of fingers being aligned with the star wheel for alternate engagement therewith when the rod is shifted to its other position.

11. Impulse-operated means for imparting rotative movements to the star wheel according to claim 9 wherein the means for delivering an impulse force to the arm comprises a switch-controlled solenoid in an electrical circuit, an armature bar carried by the arm oppositely of one pole of the solenoid is normally in spaced relation thereto, and means biasing the rocking arm away from the solenoid counter to the impulse force delivered thereby, when energized, the biasing force being of lesser magnitude whereby to yield in response to the greater force delivered by the solenoid, the arm being thereby rocked through two strokes in response to the alternate solenoid and biasing forces.

References Cited by the Examiner

UNITED STATES PATENTS

| | | | |
|---|---|---|---|
| 324,002 | 8/1885 | Brown | 235—1.3 |
| 376,467 | 1/1888 | Ballew | 74—158 X |
| 1,459,730 | 6/1923 | Harris | 235—95 X |
| 1,469,932 | 10/1923 | Adams | 235—139 |
| 2,018,858 | 10/1935 | Landlolt | 235—91 X |
| 2,082,375 | 6/1937 | Berck | 235—132 X |
| 2,091,025 | 8/1937 | Breer et al. | 235—95 X |
| 2,143,550 | 1/1939 | Gilbert | 200—19 X |
| 2,192,602 | 3/1940 | Meshberg. | |
| 2,377,583 | 6/1945 | Smith | 235—92 |
| 2,688,445 | 9/1954 | Bowers | 235—91 |
| 2,807,417 | 9/1957 | Farrell | 235—95 |
| 2,828,074 | 3/1958 | Eret | 235—95 |
| 2,904,250 | 9/1959 | Alleback | 235—91 |
| 2,996,241 | 8/1961 | Hoffmann | 235—1.3 |
| 3,001,705 | 9/1961 | Fuglister | 235—131 |
| 3,047,224 | 7/1962 | Ray et al. | 235—92 |
| 3,060,676 | 10/1962 | Epperlein | 200—19 X |
| 3,107,855 | 10/1963 | Miner | 235—139 |

FOREIGN PATENTS 1,055,296   2/1954   France.

LEO SMILOW, *Primary Examiner.*

LEYLAND M. MARTIN, *Examiner.*